(12) United States Patent
George et al.

(10) Patent No.: US 8,610,804 B1
(45) Date of Patent: Dec. 17, 2013

(54) GAIN VALUE INTERPOLATION

(75) Inventors: Adam George, Austin, TX (US);
Bradley C. Aldrich, Austin, TX (US);
Ping-Sing Tsai, Cedar Park, TX (US)

(73) Assignee: Marvell International Ltd. (BM)

( * ) Notice: Subject to any disclaimer, the term of this patent is extended or adjusted under 35 U.S.C. 154(b) by 504 days.

(21) Appl. No.: 12/712,311

(22) Filed: Feb. 25, 2010

Related U.S. Application Data

(60) Provisional application No. 61/156,666, filed on Mar. 2, 2009.

(51) Int. Cl.
*H04N 9/64* (2006.01)
*H04N 5/217* (2011.01)

(52) U.S. Cl.
USPC .......................................... 348/251; 348/241

(58) Field of Classification Search
USPC ........ 348/207.99, 222.1, 223.1, 224.1, 229.1, 348/230.1, 234, 241, 251, 254, 255; 382/254, 274
See application file for complete search history.

(56) References Cited

U.S. PATENT DOCUMENTS

| | | | | |
|---|---|---|---|---|
| 7,508,975 B2* | 3/2009 | Izumi et al. | .................... | 382/149 |
| 7,570,287 B2* | 8/2009 | Tsuruoka | ...................... | 348/241 |
| 7,834,921 B1* | 11/2010 | Pinto et al. | .................... | 348/251 |
| 2006/0087702 A1* | 4/2006 | Satoh et al. | .................... | 358/461 |
| 2009/0129695 A1* | 5/2009 | Aldrich et al. | ................ | 382/261 |

\* cited by examiner

*Primary Examiner* — Lin Ye
*Assistant Examiner* — Peter Chon

(57) ABSTRACT

An apparatus and other embodiments associated with performing interpolations to compute gain values that correct for varying spatial intensity are described. In one embodiment, an apparatus includes interpolation logic configured to determine a gain value for a pixel in image data for which there is no gain value available in the apparatus. The interpolation logic is configured to determine the gain value by performing an interpolation of related gain values available in the apparatus. The apparatus also includes falloff correction logic configured to apply the gain value to the pixel in the image data.

20 Claims, 8 Drawing Sheets

GAIN VALUE INTERPOLATION

CROSS REFERENCE TO RELATED APPLICATIONS

This application claims the benefit of U.S. provisional application Ser. No. 61/156,666 filed Mar. 2, 2009, which is hereby wholly incorporated by reference.

BACKGROUND

Images acquired by an optical camera experience a vignetting effect. The vignetting effect can yield non-uniform intensity in an image. For example, a periphery of an image may be darker than a center of an image. One cause of vignetting is that an amount of light projected through camera optics decreases with an angle of incidence against the optical axis. Another cause of vignetting is asymmetries in optics. The intensity of vignetting effects increases as lenses get smaller. Therefore, cameras in handheld electronic devices (e.g., cellular telephones) can experience significant vignetting. For example, the periphery of an image acquired by a cellular telephone camera may be 500% less bright than the center of the image.

Cameras account for vignetting by performing spatial falloff corrections. A falloff correction unit (FCU) applies a gain value to each pixel to produce a desired (e.g., uniform) brightness across an image. One conventional FCU stores in memory a gain value for each possible pixel location in an image that can be captured by a camera housing the FCU. As image sizes grow the memory required to support this conventional style FCU may become unsupportable and/or not cost effective in mobile devices. Another conventional FCU does not store any gain values but rather computes a gain value for each pixel in an image using a radial falloff computation. The radial falloff computation determines a gain value as a function of the distance of a pixel from the center of an image. This approach suffers when falloff characteristics are not uniform. Another conventional FCU also does not store any gain values but rather computes a gain value for each pixel in an image according to a general characterization equation. General characterization equations may be complex and thus computationally expensive to solve. One skilled in the art will appreciate that information included in the background section is not admitted prior art.

SUMMARY

In one embodiment, an apparatus comprises an interpolation logic that is configured to determine a gain value for a pixel in an image data for which there is no gain value available in the apparatus. The image data may have been acquired by a camera having a lens assembly. The interpolation logic is configured to determine the gain value by performing an interpolation of related gain values available in the apparatus. The apparatus also comprises a falloff correction logic that is configured to apply the gain value to the pixel in the image data.

In another embodiment, a method includes accessing a pixel in an image data. The image data is characterized with gain values that correct for varying spatial intensity. The method also includes, upon determining that a gain value that corrects for varying spatial intensity in the image data is not stored for the pixel in the digital camera performing a set of actions. The actions include identifying related gain values that are stored in the digital camera and that are related to the pixel, producing the gain value for the pixel by performing an interpolation on the related gain values, and updating the image data by applying the gain value to a pixel value associated with the pixel.

BRIEF DESCRIPTION OF THE DRAWINGS

The accompanying drawings, which are incorporated in and constitute a part of the specification, illustrate various examples of systems, methods, and other examples of embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example apparatuses and other embodiments associated with interpolating gain values that account for spatial variance in pixel intensity in images acquired using a camera. The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a storage medium that stores instructions and/or data. A computer-readable medium may take forms, including, but not limited to, non-volatile media, and volatile media. Non-volatile media may include, for example, optical disks, magnetic disks, flash, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware stored in a memory, software stored on a storage medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
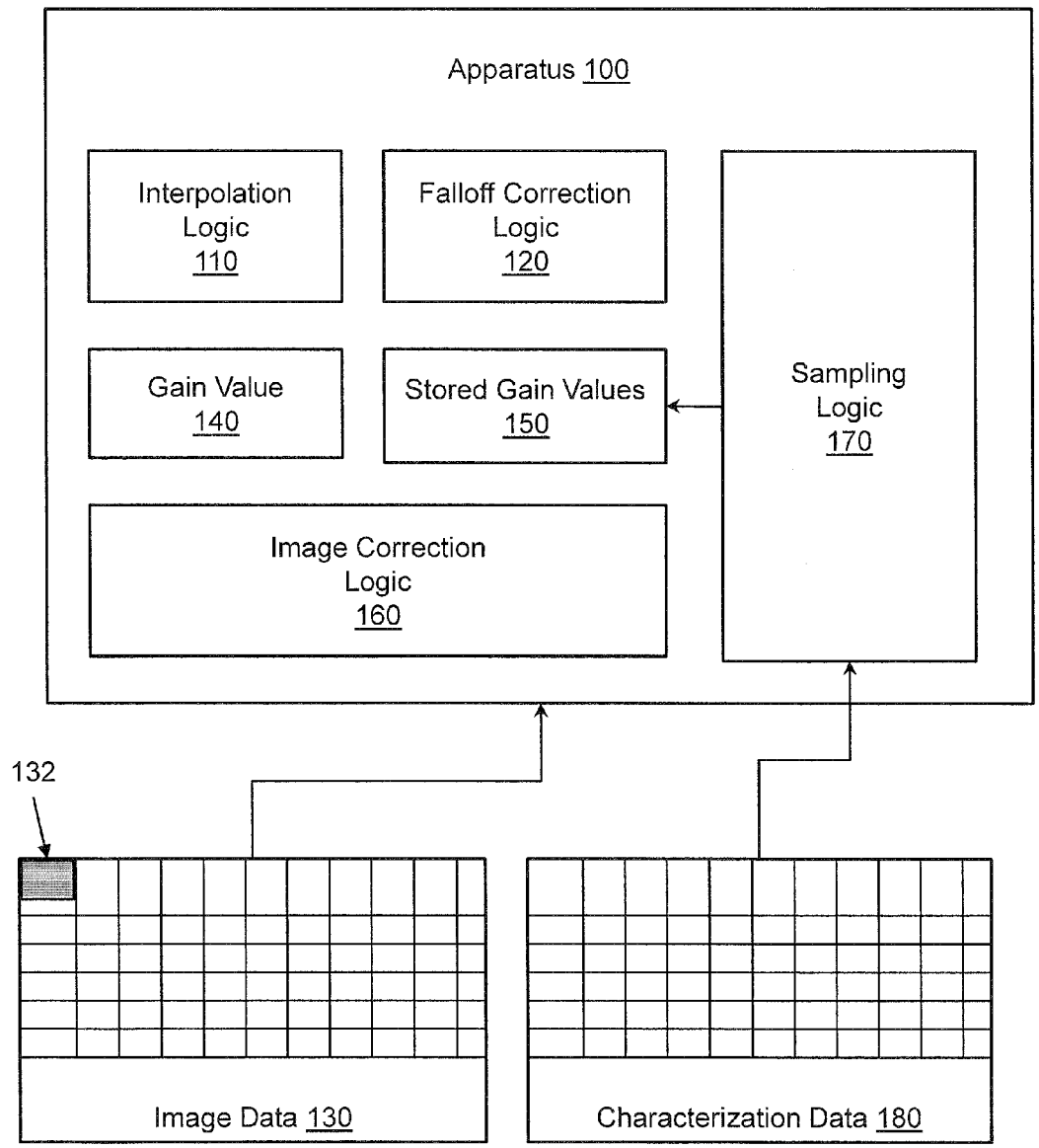
FIG. 1 illustrates one embodiment of an apparatus that performs gain value interpolation to compute gain values for a pixel in an image data.
Figure 2:
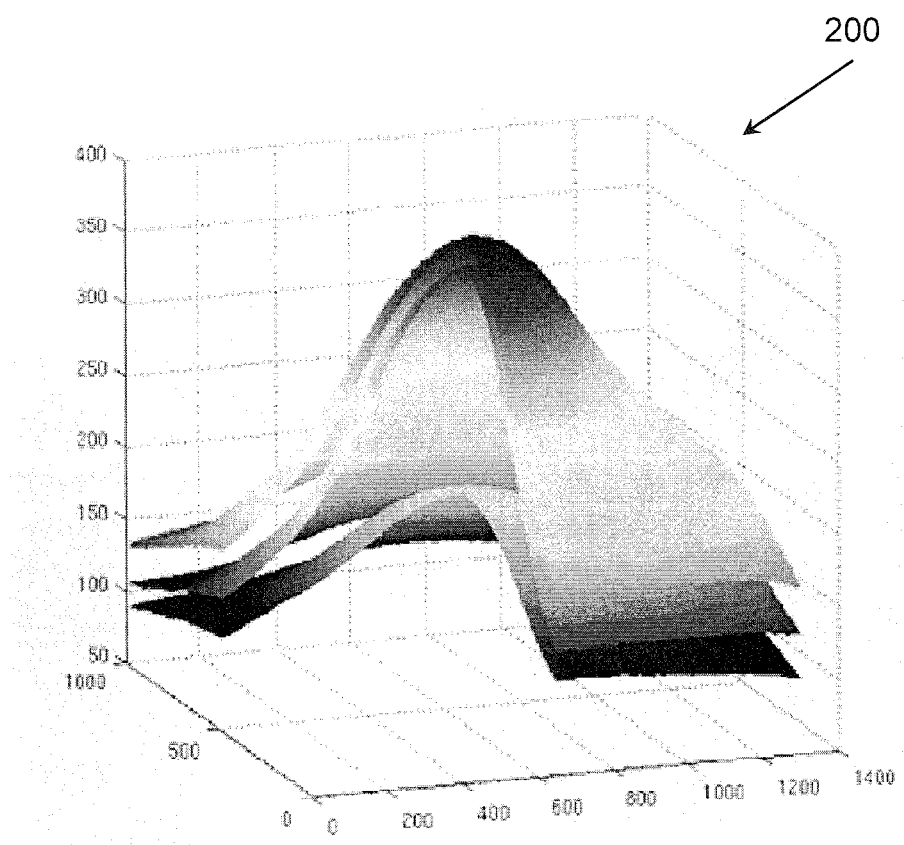
FIG. 2 illustrates typical brightness reduction of different color channels in a camera having small lens assemblies.

FIG. 1 illustrates an apparatus 100. One embodiment of apparatus 100 includes an interpolation logic 110 and a falloff correction logic 120. Interpolation logic 110 computes a gain value 140 by interpolating stored gain values 150. Apparatus 100 processes image data 130. Image data 130 includes data for pixels (e.g., pixel 132) in an image. The image data 130 is acquired by a camera having a lens assembly. Since lens assemblies produce images that suffer from vignetting, the image data 130 is unlikely to be uniform with respect to intensity. FIG. 2 illustrates a plot 200 of typical brightness reduction in a camera phone. One skilled in the art will appreciate from plot 200 that brightness may be severely compromised at, for example, the periphery of an image.

Since lens assemblies may have imperfections, the image data 130 is even less likely to be uniform with respect to intensity. Therefore a camera in which the lens assembly is manufactured may be "characterized" at some point during or after manufacture to identify the falloff characteristics in images produced using the camera and lens assembly. Apparatus 100 does not store the complete set of characterization data 180 produced during the characterization. Instead, apparatus 100 only stores a smaller, incomplete subset of the characterization data.

Since only a subset of the characterization data 180 is available in the apparatus 100, the interpolation logic 110 determines a gain value 140 for a pixel (e.g., pixel 132) in an image data 130 for which there is no gain value available in the apparatus 100. The interpolation logic 110 determines the gain value 140 by performing an interpolation of related gain values stored in stored gain values 150. In one example, the related gain values comprise four gain values associated with four corners of a rectangle bounding the pixel.

Figure 3:
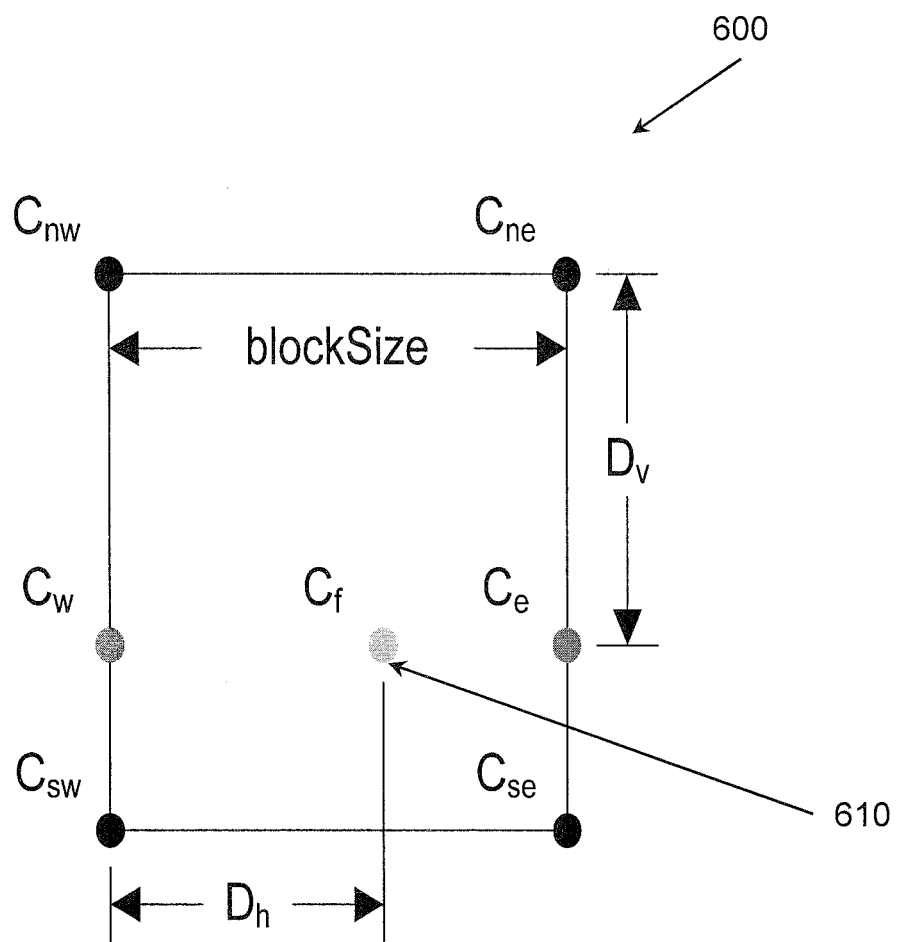
FIG. 3 illustrates one example of coefficients associated with related gain values.

FIG. 3 illustrates one example of bounding rectangle 600. In one example, interpolation logic 110 performs the interpolation by performing a linear interpolation in a horizontal orientation to produce a horizontal coefficient and performing a linear interpolation in a vertical orientation to produce a vertical coefficient. For example, assume that interpolation logic 110 will perform interpolations for point 610. The point 610 is located a horizontal distance $D_h$ from a southwest corner coefficient $C_{sw}$ and a horizontal distance blockSize—$D_h$ from a southeast corner coefficient $C_{se}$. Point 610 can also be located a vertical distance $D_v$ from a northeast corner coefficient $C_{ne}$ and a different vertical distance from the southeast corner coefficient $C_{se}$. These distances can be used to interpolate coefficient values for point 610 from the corner coefficients associated with the bounding rectangle 600. One skilled in the art will appreciate that different interpolation schemes and different orientations may be employed to compute a final coefficient $C_f$ and/or partial coefficients $C_e$ and $C_w$. One skilled in the art will appreciate that different related gain values can be employed in different interpolation schemes.

The falloff correction logic 120 applies the gain value 140 to the pixel 132 in the image data 130. In one example, the falloff correction logic 120 produces a desired degree of uniformity across pixels in the image data 130 by applying gain values to pixel values for pixels that experience optical vignetting (e.g., spatial variance in pixel intensity). In one example, a pixel value associated with a pixel comprises two or more color values. Therefore, applying a computed gain value to the pixel comprises applying the computed gain value differently for the two or more colors. Consider a Bayer color scheme. In this example different coefficients may be computed using interpolation for the different colors. Additionally, different coefficients may be computed for different treatments of a color. By way of illustration, a green pixel on a blue line may be treated differently than a green pixel on a red line and thus different coefficients may be computed and applied.

In one example, both the interpolation logic 110 and the falloff correction logic 120 are embodied on an integrated circuit. The integrated circuit may in turn be embodied in a digital camera. The digital camera may in turn be embodied in a cellular telephone, in a personal computer, in a personal digital assistant (PDA), in a handheld music player, and other devices. Manufacturers may choose to place image correction logic in these types of devices rather than trying to manufacture higher quality lenses because it may be more cost effective to correct digital image data than to attempt to acquire data that does not need correction.

Another embodiment of apparatus 100 also includes image correction logic 160. Spatially varying intensity is only one issue that can affect image quality. Image correction logic 160 can correct image data 130 in other ways including, for example, color synthesis, color management, scaling, and so on.

The image correction logic 160 may be "downstream" from the interpolation logic 110 and the falloff correction logic 120. The downstream image correction logic 160 may process the image data 130 according to a noise threshold. For example, the downstream image correction logic 160 may determine that a pixel is too noisy to contribute to a quality image and thus the pixel may be excluded from an image based on pixel noise exceeding a noise threshold. Applying a gain to a pixel changes the noise level in a pixel. Downstream image correction logic 160 may therefore recalibrate a noise threshold as a function of the gain value 140 applied to a pixel. Recalibrating the noise threshold facilitates mitigating improper noise determinations in image data 130 that has been gained up during spatially varying intensity correction.

In one example, the interpolation logic 110 interpolates a gain coefficient for the pixel. The falloff correction logic 120 provides the gain coefficient to the downstream image correction logic 160. The downstream image correction logic 160 manipulates the noise threshold as a function of the gain coefficient. In one example, the falloff correction logic 120 provides the gain coefficient to the downstream image correction logic 160 in a line buffer. While a line buffer is described, one skilled in the art will appreciate that other communication apparatus may be employed.

Another embodiment of apparatus 100 includes a sampling logic 170. Recall that a lens assembly may be characterized during or after manufacture. The characterization may produce characterization data 180. The values stored in characterization data 180 may be referred to as gain values. In one example, the characterization data 180 may include a gain value for every pixel that can be acquired using the lens assembly. In another example, the characterization data 180 may include a gain value for less than every pixel that can be acquired using the lens assembly. In either case, sampling logic 170 may select gain values to store in the apparatus 100 from the characterization data 180. Recall that different color schemes may be employed and therefore one skilled in the art will appreciate that a "gain value" may include different information for different colors in different color schemes. One skilled in the art will appreciate that apparatus 100 may also include an image data store to store the image data 130 and a correction data store to store gain values.

The sampling logic 170 may select gain values according to different schemes. In one example the sampling logic 170 may select gain values according to a uniform grid pattern. In another example, sampling logic 170 may select gain values according to a non-uniform grid pattern that yields different interpolation point densities. The non-uniform grid pattern may be designed to produce a desired correlation between interpolation point density and a rate of change in intensity falloff.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement a methodology. Blocks may be combined or separated into multiple components. Furthermore, additional and/or alternative methodologies can employ additional, not illustrated blocks.

Figure 4:
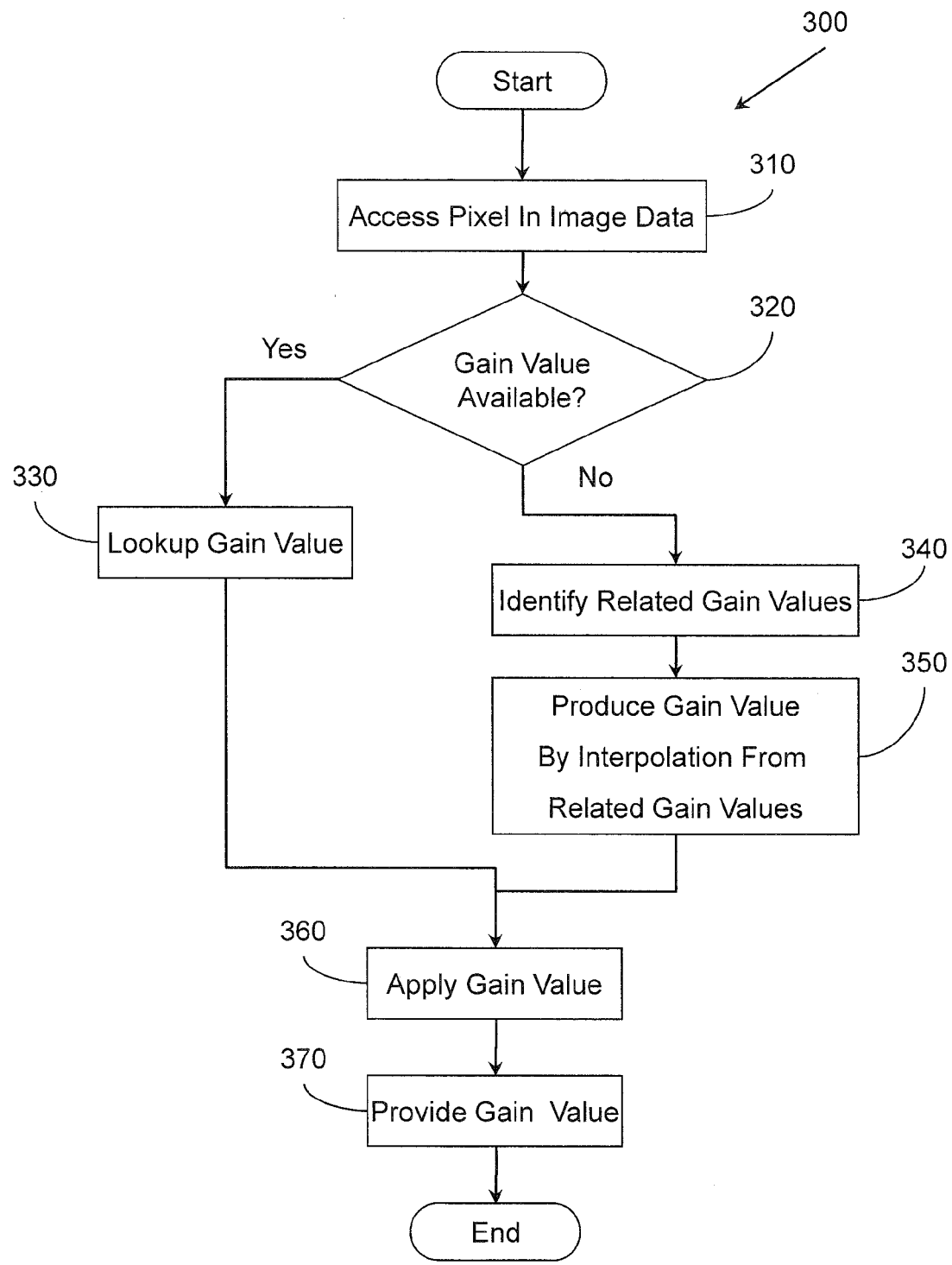
FIG. 4 illustrates one embodiment of a method that performs gain value interpolation to compute gain values for a pixel in an image data.

FIG. 4 illustrates a method 300. At 310, a pixel in an image data is accessed. The image data was acquired by a digital camera having a lens assembly that was characterized with gain values that correct for varying spatial intensity in images acquired by the digital camera.

At 320, a determination is made concerning whether an apparatus (e.g., correction circuit, camera) has stored a gain value that corrects for varying spatial intensity in the image data. If the determination at 320 is Yes, then at 330 the stored value is looked up. If the determination at 320 is No, then processing continues at 340.

At 340, related gain values that are stored in the digital camera and that are related to the pixel are identified. Once the related gain values have been identified, then at 350, interpolation is used to produce the gain value for the pixel by performing an interpolation on the related gain values. Once the gain value is computed at 350, the gain value is applied at 360 to update the image data. Updating the image data at 360 includes applying the gain value to a pixel value associated with the pixel. Recall that the pixel value may have more than one component depending on a color scheme being employed. Different color schemes include, but are not limited to different versions of RGB color schemes, Bayer color schemes, and YCbCr color schemes.

In one example identifying related gain values at 340 that are stored in the digital camera and that are related to the pixel comprises selecting related gain values that bound the pixel in a rectangle. The size of the rectangle may vary with respect to image size, the number of stored related gain values, interpolation point density, and so on. The related gain values may be selected from stored gain values in the digital camera. In different examples the stored gain values may conform to a uniform grid pattern that yields constant interpolation point densities or to a non-uniform grid pattern that yields varying interpolation point densities. The stored gain values may have been selected from gain values determined during digital camera characterization. The gain values correct for varying spatial intensity in images acquired by the digital camera.

In one example producing the gain value at 350 for the pixel by performing an interpolation on the related gain values comprises computing differently oriented coefficients. The interpolation may include computing a horizontal coefficient by performing an interpolation in a horizontal direction using related gain values spaced horizontally from the pixel. The interpolation may also include computing a vertical coefficient by performing an interpolation in a vertical direction using related gain values spaced vertically from the pixel. One skilled in the art will appreciate that different interpolations and different orientations may be employed.

In one example, updating the image data at 360 by applying the gain value to a pixel value associated with the pixel comprises updating the pixel value as a function of the horizontal coefficient and the vertical coefficient. When the pixel value includes different components for different colors then the gain values may be applied differently for the different colors.

Another embodiment of method 300 includes, at 370, providing the horizontal coefficient and/or the vertical coefficient to spatial color processing components to adjust noise thresholds associated with color processing the image data as a function of the gain value. Providing the partial computation (e.g., horizontal coefficient) of an interpolation facilitates having downstream correction components reset their noise thresholds without requiring them to repeat interpolation arithmetic.

Figure 5:
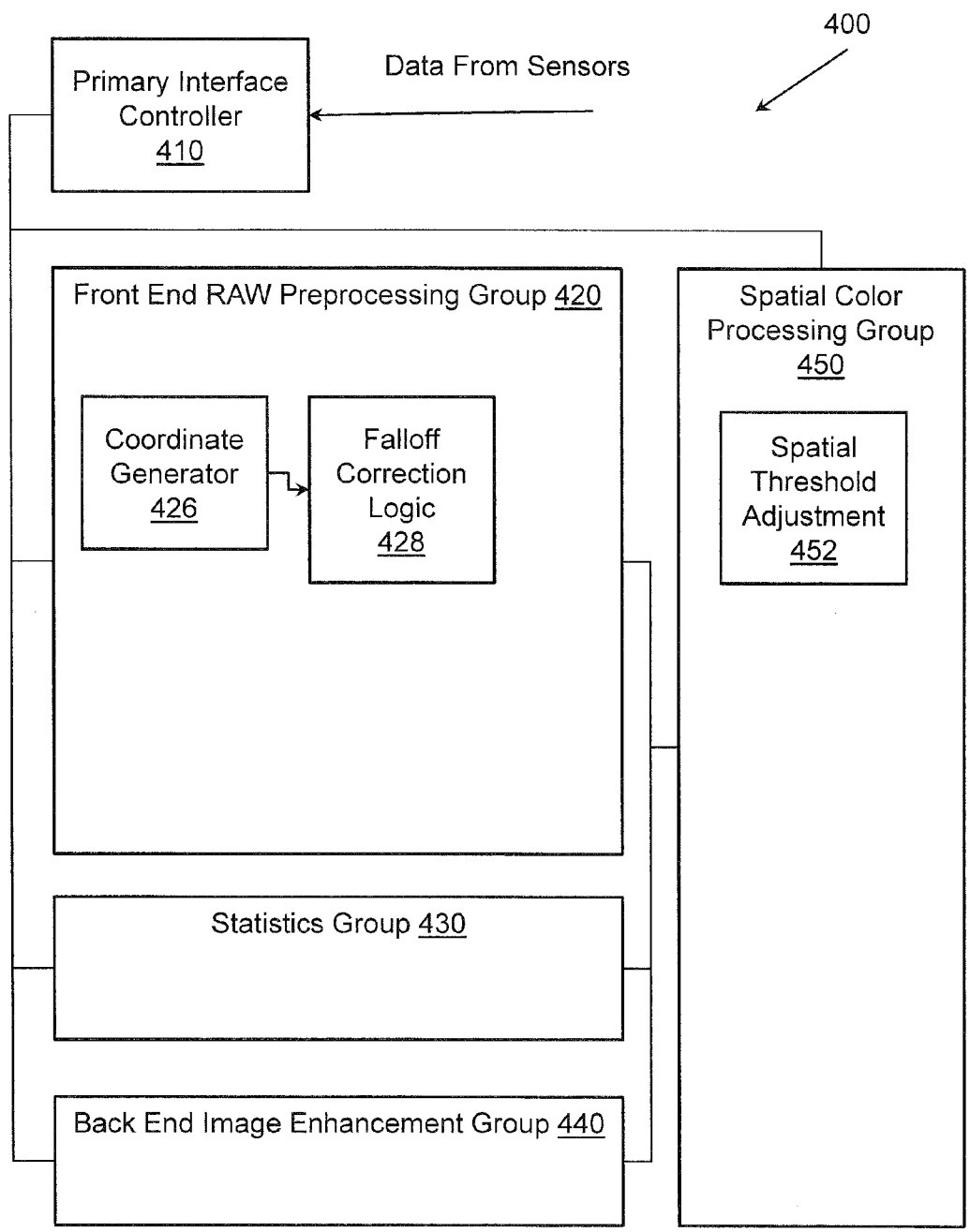
FIG. 5 illustrates one embodiment of an apparatus configured with an example of falloff correction logic.

FIG. 5 illustrates one embodiment of an apparatus 400 configured with an example of falloff correction logic 428. Data from sensors is received by a primary interface controller 410. The data may be, for example, RAW8 data, RAW10 data, YCbCr 4:2-2 data, RGB24 data, RGB16 data, and other data. The primary interface controller 410 selectively distributes data to a front end RAW preprocessing group 420, to a statistics group 430, to a back end image enhancement group 440, and to a spatial color processing group 450.

The front end RAW preprocessing group 420 includes a coordinate generator 426 that provides pixel coordinates to falloff correction logic 428. The falloff correction logic 428 does not need all the pixel data to interpolate coefficients. Instead, the falloff correction logic 428 computes coefficient values based on pixel location. The interpolated coefficient values can then be provided to other elements of apparatus 400 including the spatial processing group 450, the statistics group 430, and the back end image enhancement group 440.

The coefficients may be used to adjust thresholds. For example, spatial color processing group 450 includes a spatial threshold adjustment unit 452 that controls when an adjustment should be made for spatial variance. The adjustment can be based on a threshold of noise. A threshold used by a unit like spatial threshold adjustment unit 452 may be reconfigured based on the coefficients interpolated by and provided by the falloff correction logic 428.

The falloff correction logic 428 facilitates enhancing image quality by addressing the vignetting effect associated with camera optical systems. The falloff correction logic 428 applies gain value to pixels to restore the captured pixels to a desired (e.g., uniform) brightness across an entire image. While a uniform brightness is described, in different examples the falloff correction logic 428 could facilitate producing special effects (e.g., uniformly changing intensity, randomly changing intensity, spiral changing intensity). By way of illustration, a carnival camera may be programmed to produce distorted images of faces of people where one half of a face is very bright while another half of a face is in shadow. One skilled in the art will appreciate that falloff correction logic 428 can achieve different effects.

Figure 6:
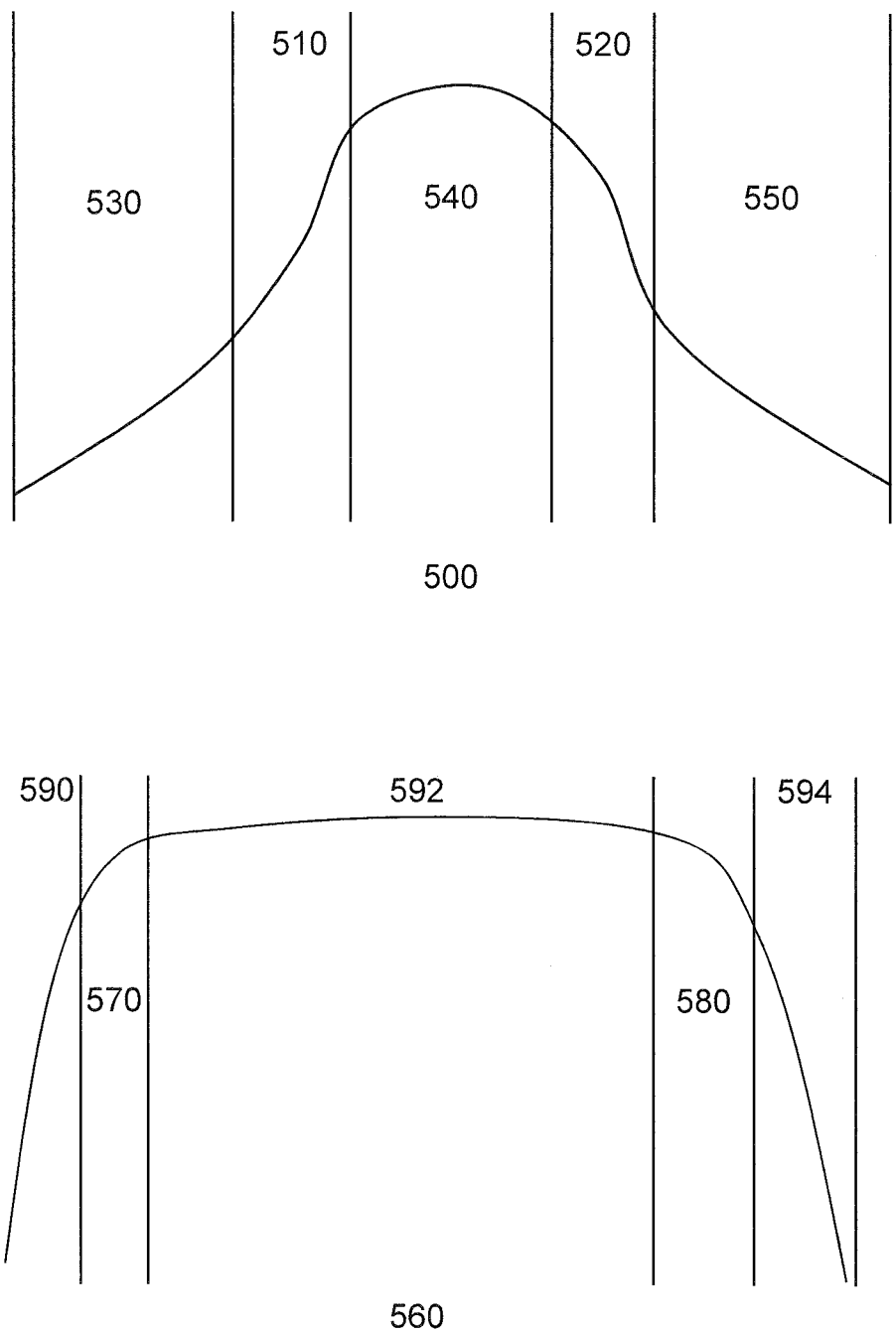
FIG. 6 illustrates different lens assembly characterization curves.

FIG. 6 illustrates falloff characteristic curves for two different optical assemblies. In regions 510 and 520 curve 500 is experiencing a greater rate of change in falloff characteristics than in regions 530, 540, and 550. In regions 570 and 580 curve 560 is experiencing a greater rate of change in falloff characteristics than in regions 590, 592, and 594. In different examples sampling logic 170 can select more data for regions where the falloff characteristics are changing more quickly and select less data for regions where the falloff characteristics are changing less quickly. Regions for which more characterization data is selected may be referred to as regions having a high interpolation point density while regions for which less characterization data is selected may be referred to as regions having a low interpolation point density. Therefore, sampling logic 170 may select more characterization data for regions 510, 520, 570, and 580 than for 530, 540, 550, 590, 592, and 594. Correlating interpolation point density to intensity falloff rate of change facilitates improving interpolation performance.

In addition to considering interpolation point density, sampling logic 170 can also select gain values as a function of lookup table size and image size. Apparatus 100 may be configured with a lookup table. The lookup table may be stored in a memory. If apparatus 100 has more memory to store characterization data then more data may be stored in the lookup table. If apparatus 100 has less memory to store characterization data, then less data may be stored in the lookup table. Table 1 illustrates one example of correlations between image size, the number of coefficients to be stored, and the size of a bounding rectangle used in interpolation. One skilled in the art will appreciate that other relationships may be employed.

TABLE 1

| Image Size | Horizontal Coefficients | Vertical Coefficients | Block Size | Per Color Channel Coefficients |
|---|---|---|---|---|
| 5376 × 4096 | 43 | 33 | 64 | 1419 |
| 3200 × 2048 | 26 | 17 | 64 | 442 |
| 2560 × 2048 | 41 | 33 | 32 | 1353 |
| 1920 × 1080 | 31 | 18 | 32 | 558 |
| 1600 × 1200 | 26 | 20 | 32 | 520 |
| 1280 × 1024 | 41 | 33 | 16 | 1353 |
| 1024 × 768 | 33 | 25 | 16 | 825 |
| 800 × 600 | 26 | 20 | 16 | 520 |
| 640 × 480 | 41 | 31 | 8 | 1271 |

Figure 7:
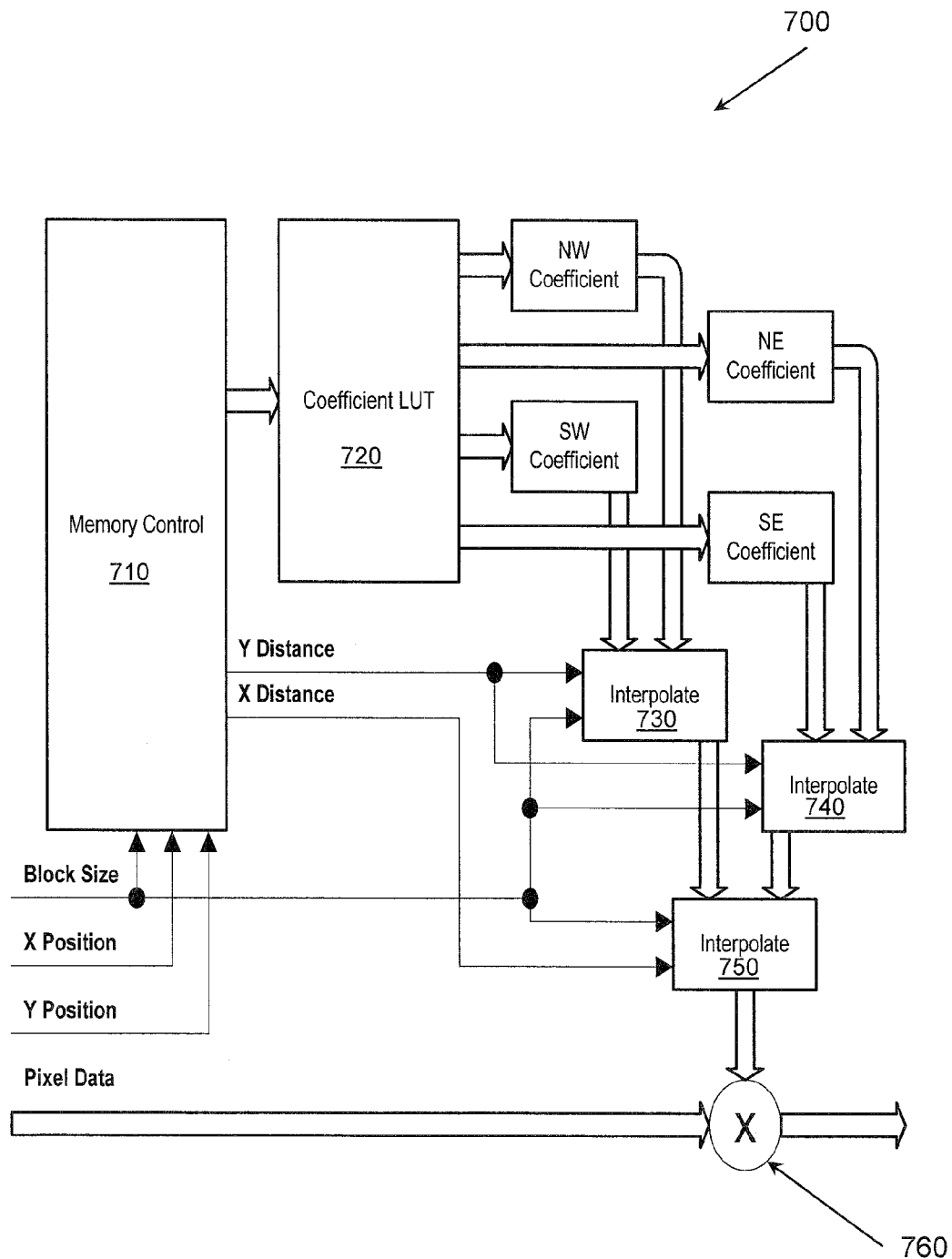
FIG. 7 illustrates one embodiment of interpolation logics.

FIG. 7 illustrates one embodiment of a falloff correction unit 700. The falloff correction unit 700 receives current pixel (x,y) coordinates, pixel data, pixel color, and block size information into a memory control 710. The block size information facilitates selecting interpolation granularity based on image size and available lookup table size. Recall that some coefficients are stored in the falloff correction unit 700. Therefore falloff correction unit 700 includes a coefficient lookup table 720. When the falloff correction unit 700 does not have stored coefficients for the (x,y) position, then coefficient lookup table 720 may provide coefficients associated with, for example, a bounding rectangle. FIG. 7 illustrates coefficient lookup table 720 providing a northwest coefficient (NW), a northeast coefficient (NE), a southwest coefficient (SW), and a southeast coefficient (SE). These coefficients may correspond to the corners of the bounding rectangle 600 (FIG. 6). One skilled in the art will appreciate that other coefficients may be provided. Two coefficients are provided to interpolate logic 730 and two coefficients are provided to interpolate logic 740. In FIG. 7, interpolate logic 730 may perform a vertical interpolation while interpolate logic 740 may also perform a vertical interpolation. Interpolate logic 750 may then perform a horizontal interpolation. The coefficients produced by interpolate logic 750 are then provided to unit 760 to be applied to the pixel data.

Figure 8:
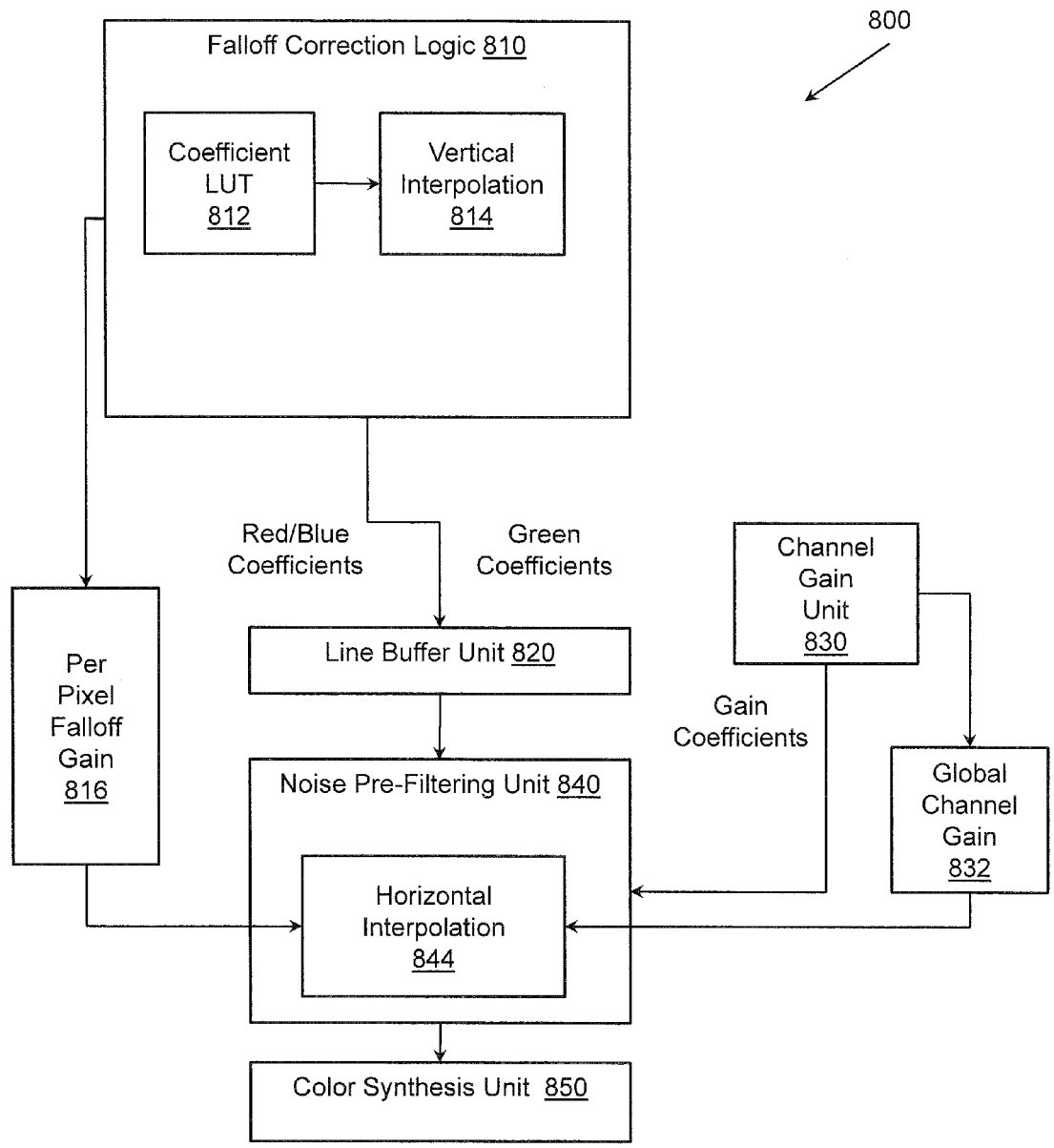
FIG. 8 illustrates one embodiment of downstream image processing logic interacting with an example of falloff correction logic.

FIG. 8 illustrates an apparatus 800 that includes a falloff correction logic 810 that provides coefficients to a noise pre-filtering unit 840 via a line buffer unit 820. The coefficients may then be provided to a color synthesis unit 850. The noise pre-filtering unit 840 also receives gain coefficients from a channel gain unit 830. The falloff correction logic 810 includes a coefficient lookup table 812 and a vertical interpolation logic 814. The falloff correction logic 810 may provide both red/blue coefficients and green coefficients to noise pre-filtering unit 840 via the line buffer unit 820. The channel gain unit 830 may be programmed from information gathered from previously acquired images. The information may be used to produce gain coefficients that are also provided to the noise pre-filtering unit 840.

In the example apparatus illustrated in FIG. 8, the falloff correction unit only performs the vertical interpolation in vertical interpolation logic 814. Horizontal interpolation would occur in noise pre-filtering unit 840. This approach facilitates reducing the likelihood that gain values will need to be computed twice for a pixel. The falloff correction logic 810 performs vertical interpolation and stores the results in the line buffer unit 820. When pixel data is read for the noise pre-filtering unit 840, the corresponding coefficients are read from the line buffer unit 820 and horizontal interpolation then occurs in logic 842. The noise pre-filtering unit 840 can then use both the per-pixel falloff gain 816 from the falloff correction logic 810 and the global channel gain 832 from channel gain unit 830 to determine pixels that should be substituted.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    an interpolation logic configured to determine a gain value for a pixel in image data for which there is no gain value available in the apparatus, wherein the interpolation logic is configured to determine the gain value by performing an interpolation of related gain values associated with four corners of a rectangle bounding the pixel, wherein the interpolation logic is configured to determine at least two partial coefficients by interpolating pairs of the related gain values;

an image correction logic configured to receive the at least two partial coefficients, and to filter noise from the image data using a noise threshold, wherein the noise threshold is modified by the at least two partial coefficients; and a falloff correction logic configured to apply the gain value to the pixel in the image data.

2. The apparatus of claim 1, wherein the related gain values comprise four gain values associated with the four corners of the rectangle bounding the pixel.

3. The apparatus of claim 2, wherein performing the interpolation comprises:

performing a linear interpolation in a horizontal orientation to produce a horizontal coefficient; and performing a linear interpolation in a vertical orientation to produce a vertical coefficient.

4. The apparatus of claim 1, wherein the falloff correction logic applies gain values to pixel values for pixels that experience spatial variance in pixel intensity.

5. The apparatus of claim 1, wherein the image data was acquired by a camera having a lens assembly.

6. The apparatus of claim 1, wherein the related gain values comprise a set of gain values associated with the vertices of a polygon bounding the pixel.

7. The apparatus of claim 6, the interpolation logic is configured to interpolate a gain coefficient for the pixel, wherein the falloff correction logic is configured to provide the gain coefficient to the image correction logic, and wherein the image correction logic is configured to manipulate a noise threshold as a function of the gain coefficient.

8. The apparatus of claim 7, wherein the falloff correction logic is configured to provide the gain coefficient to the downstream image correction logic in a line buffer.

9. The apparatus of claim 1, wherein a pixel value associated with the pixel comprises two or more color values, wherein the gain value comprises two or more values corresponding to the two or more colors, and wherein applying the gain value to the pixel comprises applying the two or more values to the two or more color values.

10. The apparatus of claim 1, further comprising:

a sampling logic configured to select gain values to store in the apparatus, wherein the gain values are selected from a set of externally stored gain values, wherein the sampling logic is configured to select the gain values according to a grid pattern, and wherein the set of externally stored gain values were acquired during characterization of the lens assembly.

11. The apparatus of claim 10, wherein the grid pattern is designed to produce a desired correlation between interpolation point density and intensity falloff rate of change.

12. The apparatus of claim 11, wherein the desired correlation has a non-uniform distribution.

13. The apparatus of claim 1, further comprising:

a sampling logic configured to select gain values to store in the apparatus from a set of externally stored gain values, wherein the sampling logic is configured to select the gain values as a function of one or more of, lookup table size, and image size, and wherein the set of externally stored gain values were acquired during characterization of the lens assembly.

14. The apparatus of claim 1, further comprising:

an image data store configured to store the image data; and a correction data store configured to store gain values that account for spatial variance in pixel intensity.

15. A method, comprising:

accessing a pixel in an image data, wherein the image data is characterized with gain values that correct for varying spatial intensity; and upon determining that a gain value that corrects for varying spatial intensity in the image data is not stored for the pixel:

identifying related gain values that are associated with four corners of a rectangle bounding the pixel;

producing the gain value for the pixel by performing an interpolation on the related gain values including determining at least two partial coefficients by interpolating pairs of the related gain values;

updating the image data by applying the gain value to a pixel value associated with the pixel; and filtering noise from the image data using a noise threshold, wherein the noise threshold is modified by the at least two partial coefficients.

16. The method of claim 15, wherein identifying related gain values that are stored in the digital camera and that are related to the pixel comprises selecting related gain values that bound the pixel in the rectangle, wherein a size of the rectangle varies with respect to image size and a number of stored related gain values, wherein the related gain values are selected from stored gain values in the digital camera, wherein the stored gain values conform to one or more of a uniform grid pattern that yields constant interpolation point densities, and a non-uniform grid pattern that yields varying interpolation point densities, and wherein the stored gain values were selected from gain values that correct for varying spatial intensity in images acquired by the digital camera as determined during digital camera characterization.

17. The method of claim 15, wherein producing the gain value for the pixel by performing an interpolation on the related gain values comprises:

computing a horizontal coefficient by performing an interpolation in a horizontal direction using related gain values spaced horizontally from the pixel; and computing a vertical coefficient by performing an interpolation in a vertical direction using related gain values spaced vertically from the pixel.

18. The method of claim 17, wherein updating the image data by applying the gain value to a pixel value associated with the pixel comprises updating the pixel value as a function of the horizontal coefficient and the vertical coefficient.

19. The method of claim 18, further comprising:

providing one or more of, the horizontal coefficient, and the vertical coefficient to spatial color processing components configured to adjust noise thresholds associated with color processing the image data as a function of the gain value.

20. The method of claim 15, wherein the image data resides in a digital camera, and wherein identifying the related gain values, producing the gain values for the pixel by performing an interpolation, and updating the image data occur in the digital camera.

* * * * *